United States Patent  
Wang

(10) Patent No.: US 11,700,127 B2
(45) Date of Patent: Jul. 11, 2023

(54) AUTHENTICATION METHOD, AUTHENTICATION DEVICE, ELECTRONIC DEVICE AND STORAGE MEDIUM

(71) Applicant: BOE TECHNOLOGY GROUP CO., LTD., Beijing (CN)

(72) Inventor: Ran Wang, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 395 days.

(21) Appl. No.: 16/938,526

(22) Filed: Jul. 24, 2020

(65) Prior Publication Data

US 2021/0099303 A1 Apr. 1, 2021

(30) Foreign Application Priority Data

Sep. 29, 2019 (CN) .......................... 201910935914.X

(51) Int. Cl.
*H04L 9/32* (2006.01)
*G10L 17/02* (2013.01)
(Continued)

(52) U.S. Cl.
CPC ............ *H04L 9/3231* (2013.01); *G10L 17/02* (2013.01); *G10L 17/04* (2013.01); *G10L 17/06* (2013.01);
(Continued)

(58) Field of Classification Search
CPC ............... H04L 9/3231; H04L 63/0442; H04L 63/0861; H04L 63/126; H04L 9/0894;
(Continued)

(56) References Cited

U.S. PATENT DOCUMENTS

| 5,913,188 A | * | 6/1999 | Tzirkel-Hancock .... G10L 15/02 704/223 |
| 2007/0106895 A1 | | 5/2007 | Huang et al. |
| 2013/0262873 A1 | * | 10/2013 | Read .................. H04L 63/0861 713/186 |
| 2017/0279815 A1 | * | 9/2017 | Chung .................. H04L 9/0891 |

(Continued)

FOREIGN PATENT DOCUMENTS

| CN | 104735065 A | 6/2015 |
| CN | 105933280 A | 9/2016 |

(Continued)

OTHER PUBLICATIONS

The Math and the key-concept of the "RSA Public-Key Cryptography" By Urban Avierfjard Apr. 13, 2013 (Year: 2013).*

(Continued)

*Primary Examiner* — Farid Homayounmehr
*Assistant Examiner* — Brian William Avery
(74) *Attorney, Agent, or Firm* — Brooks Kushman P.C.

(57) ABSTRACT

The present disclosure provides an authentication method, an authentication device, an electronic device and a storage medium. The authentication method includes: receiving target voice data; obtaining a first voiceprint feature parameter corresponding to the target voice data from a device voiceprint model library; performing a first encryption process on the first voiceprint feature parameter with a locally stored private key to generate to-be-verified data; transmitting the to-be-verified data to a server, so that the server uses a public key which matches the private key to decrypt the to-be-verified data to obtain the first voiceprint feature parameter, and performs authentication on the first voiceprint feature parameter to obtain an authentication result; receiving the authentication result returned by the server.

7 Claims, 5 Drawing Sheets

(51) Int. Cl.
*G10L 17/04* (2013.01)
*G10L 17/06* (2013.01)
*G10L 25/18* (2013.01)
*G10L 25/21* (2013.01)
*G10L 25/24* (2013.01)
*H04L 9/40* (2022.01)

(52) U.S. Cl.
CPC .............. *G10L 25/18* (2013.01); *G10L 25/21* (2013.01); *G10L 25/24* (2013.01); *H04L 9/3236* (2013.01); *H04L 63/0442* (2013.01)

(58) Field of Classification Search
CPC .................. H04L 9/3236; H04L 9/3239; H04L 9/3247; H04L 9/00; H04L 9/32; H04L 9/3249; H04L 9/3252; H04L 9/3255; H04L 9/3257; H04L 2209/34; G10L 17/02; G10L 17/06; G10L 17/08; G10L 25/18; G10L 25/21; G10L 25/24; G10L 17/04
See application file for complete search history.

(56) References Cited

U.S. PATENT DOCUMENTS

| 2018/0146370 A1* | 5/2018 | Krishnaswamy ..... G10L 19/018 |
| 2019/0268160 A1 | 8/2019 | Meng |
| 2020/0250679 A1* | 8/2020 | Arora ............... G06Q 20/40145 |

FOREIGN PATENT DOCUMENTS

| CN | 105959287 A | 9/2016 |
| CN | 106572082 A | 4/2017 |
| CN | 107169374 A | 9/2017 |
| CN | 108122557 A | 6/2018 |
| CN | 208525617 U | 2/2019 |

OTHER PUBLICATIONS

First Office Action for Chinese Application No. 201910935914.X, dated Jan. 27, 2022, 12 Pages.
CN108122557A, English Abstract and Machine Translation.
CN208525617U, English Abstract and Machine Translation.

* cited by examiner

AUTHENTICATION METHOD, AUTHENTICATION DEVICE, ELECTRONIC DEVICE AND STORAGE MEDIUM

CROSS-REFERENCE TO RELATED APPLICATION

This application claims priority to Chinese Application No. 201910935914.X, filed on Sep. 29, 2019, which is incorporated herein by reference in its entirety.

TECHNICAL FIELD

The present disclosure relates to the field of data encryption processing technologies, and in particular to an authentication method, an authentication device, an electronic device and a storage medium.

BACKGROUND

With rapid development of electronic devices, smart mirror devices have gradually become popular. As entrance of Internet of Things (IoT) devices, the smart mirror device is convenient for accessing and controlling a variety of IoT devices including access control systems, security systems and health monitoring systems, and is responsible for information collection, information reporting and issuance of various control commands. Therefore, the security of the smart mirror device is particularly important.

SUMMARY

One embodiment of the present disclosure provides an authentication method applied to an electronic device, including: receiving target voice data; obtaining a first voiceprint feature parameter corresponding to the target voice data from a device voiceprint model library; performing a first encryption process on the first voiceprint feature parameter with a locally stored private key to generate to-be-verified data; transmitting the to-be-verified data to a server, so that the server uses a public key which matches the private key to decrypt the to-be-verified data to obtain the first voiceprint feature parameter, and performs authentication on the first voiceprint feature parameter to obtain an authentication result; receiving the authentication result returned by the server.

Optionally, the obtaining a first voiceprint feature parameter corresponding to the target voice data from a device voiceprint model library, includes: extracting a target voiceprint feature parameter in the target voice data; matching the target voiceprint feature parameter with a plurality of voiceprint feature parameters pre-stored in the device voiceprint model library, thereby obtaining at least one matched voiceprint feature parameter; obtaining a matching probability value between the target voiceprint feature parameter and each of the at least one matched voiceprint feature parameter; determining the first voiceprint feature parameter from the at least one matched voiceprint feature parameter, according to a similarity criterion and the matching probability value.

Optionally, the performing a first encryption process on the first voiceprint feature parameter with a locally stored private key to generate to-be-verified data, includes: obtaining a first hash value corresponding to the first voiceprint feature parameter via calculation; obtaining a device identifier of the electronic device; obtaining a group identifier of a group in which the first voiceprint feature parameter is located in the device voiceprint model library; encrypting the first hash value, the device identifier and the group identifier with the private key to generate the to-be-verified data.

Optionally, the receiving the authentication result returned by the server, includes: receiving from the server, an encrypted authentication result of using the public key to encrypt the authentication result and a preset key. After the receiving the authentication result returned by the server, the method further includes: decrypting the encrypted authentication result with the private key to obtain the preset key and the authentication result; when the authentication result is successful authentication, obtaining a data request; encrypting the data request with the preset key to obtain an encrypted data request; transmitting the encrypted data request to the server.

Optionally, the receiving target voice data, includes: using a voice acquirer of a device to acquire voice signals.

One embodiment of the present disclosure provides an authentication method applied to a server, including: receiving to-be-verified data encrypted with a private key, transmitted by an electronic device; decrypting the to-be-verified data with a public key corresponding to the private key, to obtain to-be-verified decrypted data; obtaining a second voiceprint feature parameter corresponding to the to-be-verified decrypted data from a server voiceprint model library; performing authentication processing on the to-be-verified decrypted data according to the second voiceprint feature parameter to obtain an authentication result; encrypting the authentication result with the public key to obtain an encrypted authentication result; transmitting the encrypted authentication result to the electronic device.

Optionally, before the receiving to-be-verified data encrypted with a private key, transmitted by an electronic device, the method further includes: pre-processing voice data input by a plurality of users to obtain corresponding audio samples; performing transformation processing on each of the audio samples to generate a voiceprint feature parameter corresponding to each voice data; training an initial Gaussian mixture model (GMM) based on a plurality of voiceprint feature parameters to generate a voiceprint model library; storing the voiceprint model library locally to obtain the server voiceprint model library, and transmitting the voiceprint model library to the electronic device for storage to obtain a device voiceprint model library.

Optionally, the pre-processing voice data input by a plurality of users to obtain corresponding audio samples, includes: acquiring voice signals input by a plurality of users; performing type conversion processing on each of the voice signals to obtain a plurality of voice data; performing pre-emphasis processing on each voice data to obtain a plurality of pre-emphasized voice data; dividing each pre-emphasized voice data into a plurality of voice segments according to a preset sampling rate by using frame blocking-windowing technique; obtaining an effective voice segment from the plurality of voice segments, and using the effective voice segment as the audio sample.

Optionally, the performing transformation processing on each of the audio samples to generate a voiceprint feature parameter corresponding to each voice data, includes: performing Fourier transform processing on each audio sample to obtain a linear frequency spectrum corresponding to each frame of audio signal included in the each audio sample; performing modulo processing on the linear frequency spectrum corresponding to each frame of audio signal to obtain an energy spectrum corresponding to the linear frequency spectrum; performing scale transformation processing on the energy spectrum corresponding to the linear frequency spectrum to obtain a transformed energy spectrum corresponding to the linear frequency spectrum; performing cepstral analysis on the transformed energy spectrum to determine the voiceprint feature parameter corresponding to the voice data.

Optionally, before the receiving to-be-verified data encrypted with a private key, transmitted by an electronic device, the method further includes: obtaining a first prime number and a second prime number that are selected in advance and are greater than a set threshold; obtaining a first value via calculation according to the first prime number and the second prime number; obtaining an Euler value via calculation according to the first value and Euler function; obtaining a prime number that is coprime with the Euler value; wherein the prime number is greater than 1 and less than the Euler value; obtaining a second value via calculation based on the prime number and the Euler value according to a complementary function; obtaining the public key via calculation based on the prime number and the first value; obtaining the private key via calculation based on the first value and the second value; storing the public key locally, and transmitting the private key to the electronic device.

Optionally, the to-be-verified decrypted data includes a group identifier of a group in which a first voiceprint feature parameter is located in a device voiceprint model library, a device identifier of the electronic device and a first hash value corresponding to the first voiceprint feature parameter. The obtaining a second voiceprint feature parameter corresponding to the to-be-verified decrypted data from a server voiceprint model library, includes: searching for the second voiceprint feature parameter corresponding to the group identifier from the server voiceprint model library according to the device identifier. The performing authentication processing on the to-be-verified decrypted data according to the second voiceprint feature parameter to obtain an authentication result, includes: obtaining a second hash value corresponding to the second voiceprint feature parameter via calculation; comparing the second hash value with the first hash value to obtain a comparison result; determining the authentication result according to the comparison result.

Optionally, the determining the authentication result according to the comparison result, includes: when the comparison result is that the second hash value and the first hash value are the same, obtaining a result of successful authentication; when the comparison result is that the second hash value is different from the first hash value, obtaining a result of unsuccessful authentication.

Optionally, the receiving to-be-verified data encrypted with a private key, transmitted by an electronic device, includes: receiving the to-be-verified data encrypted with the private key, transmitted by a device.

One embodiment of the present disclosure provides an authentication device applied to an electronic device, including: a target voice data receiver configured to receive target voice data; a first voiceprint feature acquirer configured to obtain a first voiceprint feature parameter corresponding to the target voice data from a device voiceprint model library; a to-be-verified data generator configured to perform a first encryption process on the first voiceprint feature parameter with a locally stored private key to generate to-be-verified data; a to-be-verified data transmitter configured to transmit the to-be-verified data to a server, so that the server uses a public key which matches the private key to decrypt the to-be-verified data to obtain the first voiceprint feature parameter, and performs authentication on the first voiceprint feature parameter to obtain an authentication result; an authentication result receiver configured to receive the authentication result returned by the server.

Optionally, the target voice data receiver is a voice acquirer of a device.

One embodiment of the present disclosure provides an authentication device applied to a server, including: a to-be-verified data receiver configured to receive to-be-verified data encrypted with a private key, transmitted by an electronic device; a decrypted data acquirer configured to decrypt the to-be-verified data with a public key corresponding to the private key, to obtain to-be-verified decrypted data; a second voiceprint feature acquirer configured to obtain a second voiceprint feature parameter corresponding to the to-be-verified decrypted data from a server voiceprint model library; an authentication result acquirer configured to perform authentication processing on the to-be-verified decrypted data according to the second voiceprint feature parameter to obtain an authentication result; an encrypted authentication result acquirer configured to encrypt the authentication result with the public key to obtain an encrypted authentication result; and an encrypted authentication result transmitter configured to transmit the encrypted authentication result to the electronic device.

One embodiment of the present disclosure provides an electronic device including: a processor, a memory, and a computer program stored on the memory and executable on the processor; wherein the processor executes the computer program to implement the above authentication method.

One embodiment of the present disclosure provides a computer non-transitory readable storage medium including computer instructions stored thereon. The computer instructions are executed by a processor of an electronic device to cause the electronic device to implement the above authentication method.

DETAILED DESCRIPTION

In order to make the objects, features and the advantages of the present disclosure more apparent, the present disclosure will be described hereinafter in a clear and complete manner in conjunction with the drawings and embodiments.

In order to ensure the security of IoT devices, commonly used authentication methods include login passwords, fingerprint authentication, face recognition and voiceprint recognition, etc. However, due to structural limitations of the smart mirror device, it is necessary to prevent mirror dirt caused by excessive touch, and thus the login password authentication method and the fingerprint authentication method cannot be applied to the smart mirror device. Meanwhile, camera input mode employed in the face recognition easily brings the privacy risk to users.

In view of this, embodiments of the present disclosure provide an authentication method, an authentication device, an electronic device and a storage medium, which can solve the problem of privacy leakage caused by authentication methods such as login passwords, fingerprint authentication and face recognition.

Figure 1A:
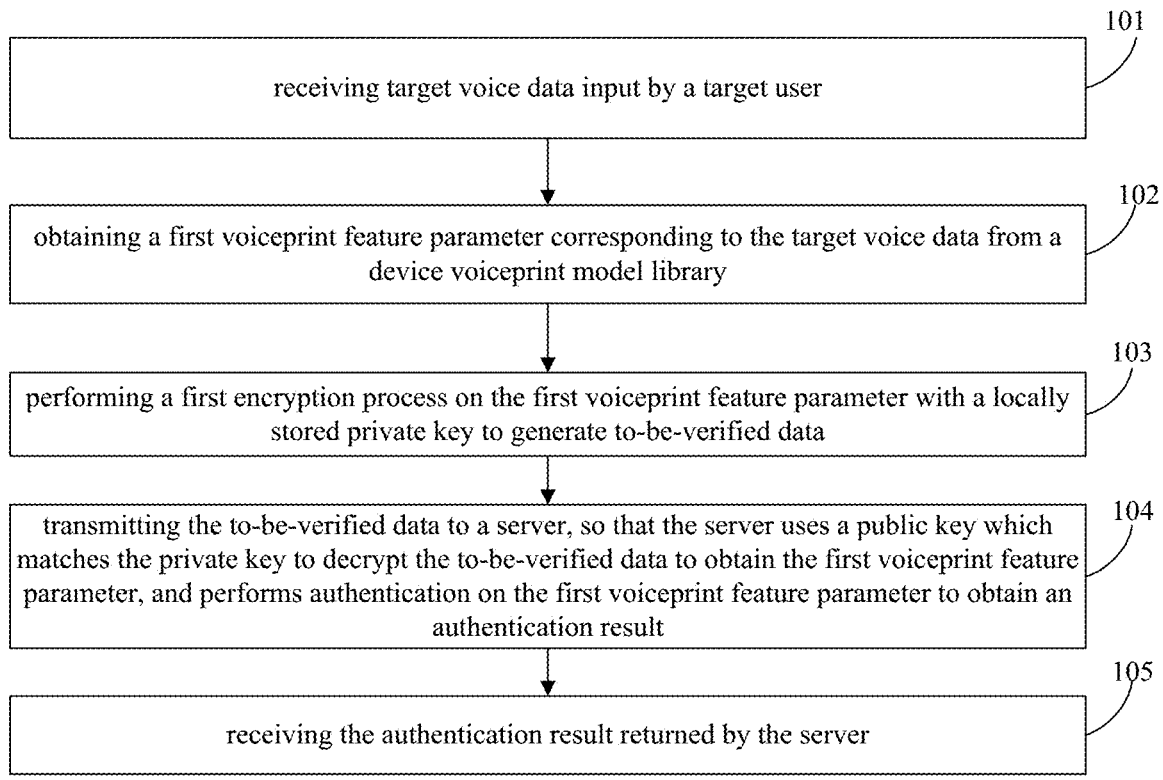
FIG. 1A is a flowchart of an authentication method according to an embodiment of the present disclosure.

Referring to FIG. 1A, FIG. 1A is a flowchart of an authentication method according to an embodiment of the present disclosure. The authentication method may be applied to an electronic device and include the following steps.

Step 101: receiving target voice data input by a target user.

In one embodiment of the present disclosure, the electronic device may be a smart mirror device. The smart mirror device refers to a mirror, which is embedded with a display screen, a sensor and an operating system and which has a mirror display function and a human-mirror interaction function. The smart mirror device has become the "fourth screen" other than computers, TVs, mobile phones, etc.

In the following embodiments, by taking the electronic device as a smart mirror device as an example, the technical solutions of the embodiments of the present disclosure will be described in detail.

The smart mirror device may include: a life module such as weather, travel, calendar, time; a smart home module such as switch, socket, curtain, camera, access control; a health module such as blood pressure, blood sugar, weight, sleep; and a beauty module such as skin detection and lift/contouring.

Certainly, the smart mirror device may further provide functions such as health services and entertainment, which may be determined according to actual situations and is not limited in the embodiments of the present disclosure.

The target voice data refers to voice data obtained by pre-processing acquired voice signals input by the user.

A voice acquirer may be set in advance on the smart mirror device. The voice acquirer may be a voice signal acquisition device such as an audio head and an audio monitor head. The voice acquirer can acquire voice signals input by the user and pre-process the voice signals, thereby obtaining the target voice data.

After receiving the target voice data input by the target user, step 102 is performed.

Step 102: obtaining a first voiceprint feature parameter corresponding to the target voice data from a device voiceprint model library.

The device voiceprint model library refers to a model library that is pre-stored in a local system and is used to store voiceprint feature parameters. The device voiceprint model library stores in advance voiceprint feature parameters of authorized users. For example, the smart mirror device has authorized a user "A", a user "B" and a user "C", then, the smart mirror device may store voiceprint feature parameters corresponding to the user "A", the user "B" and the user "C" in the device voiceprint model library.

After obtaining a locally stored device voiceprint model library, a matched first voiceprint feature parameter is obtained by matching the voiceprint feature parameter corresponding to the target voice data with voiceprint feature parameters in the device voiceprint model library. Specifically, it is described in detail with reference to the following specific implementation.

Figure 1B:
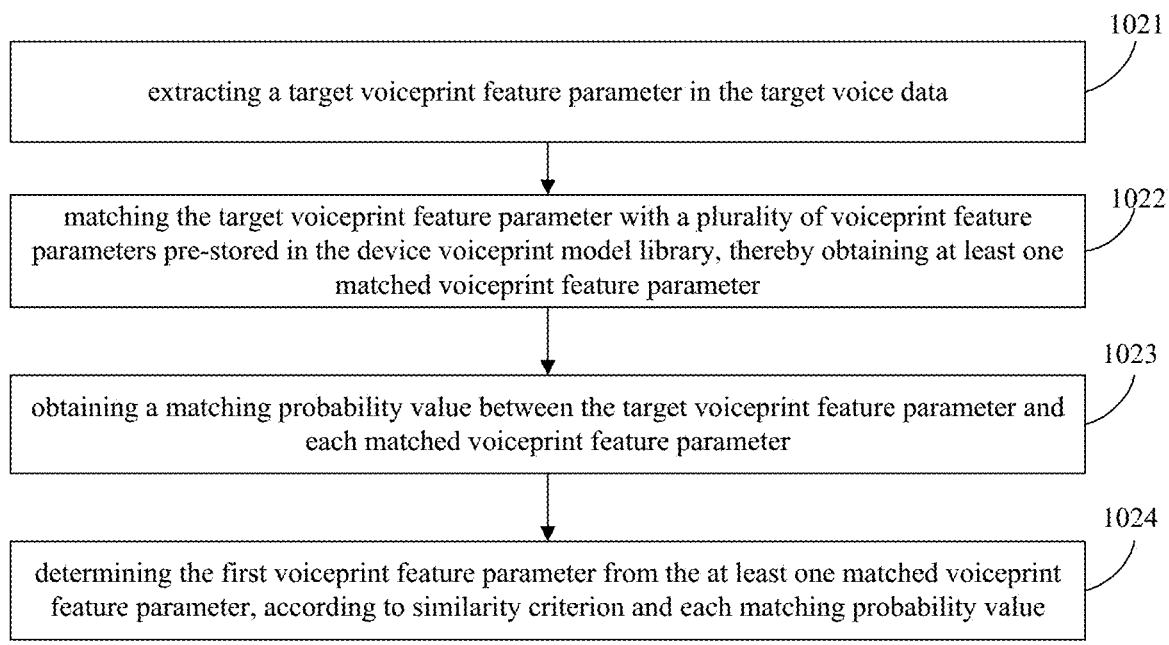
FIG. 1B is a flowchart of determining a voiceprint feature parameter according to an embodiment of the present disclosure.

In a specific implementation of the present disclosure, as shown in FIG. 1B, the foregoing step 102 may include the following sub-steps.

Sub-step 1021: extracting a target voiceprint feature parameter in the target voice data.

In one embodiment of the present disclosure, the target voiceprint feature parameter refers to a voiceprint feature parameter extracted from the target voice data.

After the target voice data input by the target user is acquired, the target voiceprint feature parameter can be extracted from the target voice data, and then sub-step 1022 is performed.

Sub-step 1022: matching the target voiceprint feature parameter with a plurality of voiceprint feature parameters pre-stored in the device voiceprint model library, thereby obtaining at least one matched voiceprint feature parameter.

After the target voiceprint feature parameter is extracted, the target voiceprint feature parameter can be matched with multiple voiceprint feature parameters pre-stored in the device voiceprint model library. When the matching fails, the subsequent steps are not performed.

It will be appreciated that the embodiments of the present disclosure merely consider the case of successful matching.

When the matching is successful, at least one matched voiceprint feature parameter, which matches the target voiceprint feature parameter, may be obtained.

After matching the target voiceprint feature parameter with a plurality of voiceprint feature parameters pre-stored in the device voiceprint model library, thereby obtaining at least one matched voiceprint feature parameter, sub-step 1023 is performed.

Sub-step 1023: obtaining a matching probability value between the target voiceprint feature parameter and each matched voiceprint feature parameter.

After obtaining at least one matched voiceprint feature parameter, the matching probability value between the target voiceprint feature parameter and each matched voiceprint feature parameter may be obtained.

The greater the matching probability value, the higher the matching degree, and the smaller the matching probability value, the lower the matching degree.

The technique for obtaining the matching probability value is a mature technique in the art, which will not be described in detail herein.

After obtaining the matching probability value between the target voiceprint feature parameter and each matched voiceprint feature parameter, sub-step 1024 is performed.

Sub-step 1024: determining the first voiceprint feature parameter from the at least one matched voiceprint feature parameter, according to a similarity criterion and each matching probability value.

After the matching probability value is obtained via calculation, the first voiceprint feature parameter may be determined from the at least one matched voiceprint feature parameter according to the similarity criterion. Specifically, according to the similarity criterion, an optimal result may be determined for decision, and an optimal decision threshold may be obtained by experiment.

After obtaining the first voiceprint feature parameter corresponding to the target voice data from the device voiceprint model library, step 103 is performed.

Step 103: performing a first encryption process on the first voiceprint feature parameter with a locally stored private key to generate to-be-verified data.

In one embodiment of the present disclosure, RSA public key encryption algorithm (RSA algorithm) is used to encrypt a data request transmitted between the smart mirror device and a server. A private key is stored on the smart mirror device, and a public key is stored on the server. The public key and the private key are pre-generated by the server, and the server stores the public key, and the smart mirror device stores the private key.

After the first voiceprint feature parameter of the target user is obtained, the first encryption process may be performed on the first voiceprint feature parameter with the private key, thereby obtaining the encrypted to-be-verified data.

The process of encrypting the first voiceprint feature parameter may refer to the following description of a specific implementation.

Figure 1C:
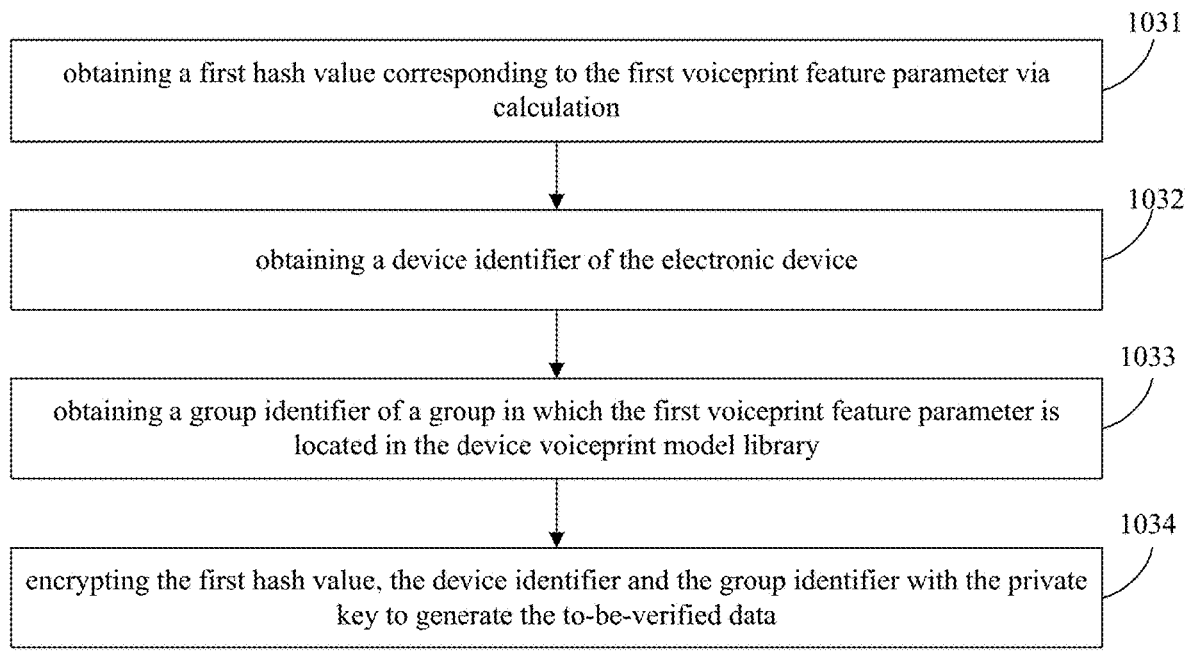
FIG. 1C is a flowchart of generating to-be-verified data according to an embodiment of the present disclosure.

In a specific implementation of the present disclosure, as shown in FIG. 1C, the foregoing step 103 may include the following sub-steps.

Sub-step 1031: obtaining a first hash value corresponding to the first voiceprint feature parameter via calculation.

In one embodiment of the present disclosure, the first hash value refers to a hash value obtained by performing calculation on the first voiceprint feature parameter.

The Hash value is also referred to as a hash function or hash algorithm, and is a method to create a small digital "fingerprint" from any kind of data. The hash function compresses a message or data into a digest, thereby making the amount of data smaller and fixing the format of the data. The Hash function scrambles the data and recreates a fingerprint called a hash value.

After the first voiceprint feature parameter is obtained, a hash value (i.e., the first hash value) corresponding to the first voiceprint feature parameter may be obtained via calculation.

Sub-step 1032: obtaining a device identifier of the electronic device.

The device identifier refers to an identifier corresponding to the electronic device.

The device identifier may be stored in advance in a specified storage space corresponding to the smart mirror device. When needed, the device identifier of the smart mirror device may be directly obtained from the specified storage space.

Sub-step 1033: obtaining a group identifier of a group in which the first voiceprint feature parameter is located in the device voiceprint model library.

In the device voiceprint model library, different voiceprint feature parameters are corresponding to different groups, and each group is corresponding to a unique group identifier. For example, the first voiceprint feature parameter is located in group 1, a group identifier of the group 1 is "a".

After the first voiceprint feature parameter is obtained, a group in which the first voiceprint feature parameter is located in the device voiceprint model library may be found and a group identifier of this group is obtained, and then sub-step 1034 is performed.

Sub-step 1034: encrypting the first hash value, the device identifier and the group identifier with the private key to generate the to-be-verified data.

In the foregoing steps, after obtaining the first hash value, the device identifier and the group identifier, the first hash value, the device identifier and the group identifier may be encrypted with the private key, thereby generating the to-be-verified data.

After the first encryption processing is performed on the first voiceprint feature parameter with the locally stored private key to generate to-be-verified data, step 104 is performed.

Step 104: transmitting the to-be-verified data to a server, so that the server uses a public key which matches the private key to decrypt the to-be-verified data to obtain the first voiceprint feature parameter, and performs authentication on the first voiceprint feature parameter to obtain an authentication result.

After generating the to-be-verified data, the to-be-verified data may be transmitted to the server. Then, the server may use the public key which matches the private key to decrypt the to-be-verified data to obtain the first voiceprint feature parameter, and then performs authentication on the first voiceprint feature parameter to obtain an authentication result. The detailed process of decryption and authentication will be described in detail in the following embodiment.

After the server obtains the authentication result, the server may encrypt the authentication result with a randomly generated preset key and the public key, thereby obtaining an encrypted authentication result. Then, the server returns the encrypted authentication result to the smart mirror device.

Step 105: receiving the authentication result returned by the server.

The smart mirror device can receive the authentication result returned by the server. It will be appreciated that the authentication result may include a result of successful authentication or a result of unsuccessful authentication. In case of successful authentication, the user can perform a corresponding operation on an IoT device associated with the smart mirror device, such as an access control system, a security system and a health monitoring system.

In case of unsuccessful authentication, it indicates that the target user is not an authorized user and cannot control the IoT device associated with the smart mirror device.

After obtaining the authentication result, in case of successful authentication, the user can control the IoT device associated with the smart mirror device by transmitting a data request to the server through the smart mirror device, which will be described in detail in conjunction with the following specific implementation.

In a specific implementation of the present disclosure, the foregoing step 105 may include the following sub-steps.

Sub-step S1: receiving from the server, an encrypted authentication result of using the public key to encrypt the authentication result and the preset key.

In one embodiment of the present disclosure, the preset key refers to a key randomly generated by the server, for example, a 112-bit encryption key K which is randomly generated by the server.

The authentication result refers to a result obtained after the server performs authentication on the to-be-verified data transmitted by the electronic device. The authentication result may include a result of successful authentication and a result of unsuccessful authentication.

After the server randomly generates the preset key, the server may use the pre-stored public key to encrypt the preset key and the authentication result to obtain the encrypted authentication result. And then, the server returns the encrypted authentication result to the smart mirror device.

The smart mirror device receives the encrypted authentication result returned by the server and executes the following steps.

Figure 1D:
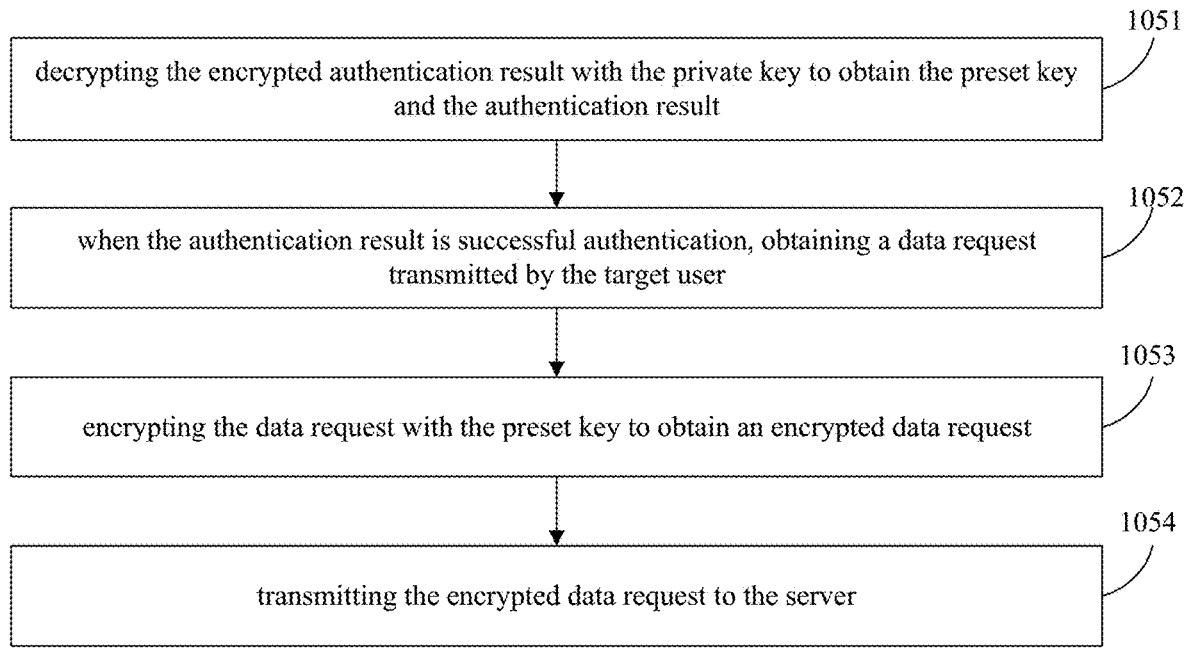
FIG. 1D is a flowchart of generating an encrypted data request according to an embodiment of the present disclosure.

After the foregoing step 105, as shown in FIG. 1D, the authentication method may further include the following steps.

Step 1051: decrypting the encrypted authentication result with the private key to obtain the preset key and the authentication result.

After the smart mirror device receives the encrypted authentication result returned by the server, the smart mirror device can decrypt the encrypted authentication result with the private authentication key, so that the preset key and the authentication result can be parsed, and then step 1052 is performed.

Step 1052: when the authentication result is successful authentication, obtaining a data request transmitted by the target user.

When the authentication result is successful authentication, the target user can control the IoT device associated with the smart mirror device. Specifically, control instructions such as turning on an air conditioner and playing music, which are corresponding to the IoT device, can be generated. For example, when the user needs to operate IoT peripherals such as access control and security, the user needs to read out a fixed unlock code. The fixed reading facilitates voiceprint recognition and calibration data. In case of voiceprint recognition authorization, the users may control opening or closing of access control or security equipment by clicking buttons or voice control.

The smart mirror device may receive a control instruction input by the user, and generate a corresponding data request according to the control instruction, and then step 1053 is performed.

Step 1053: encrypting the data request with the preset key to obtain an encrypted data request.

After obtaining the data request, the data request may be encrypted with the preset key to obtain the encrypted data request. Since the RSA algorithm needs to perform modulo operation, it has a lower calculation speed and is not suitable for encryption every time. Thus, the 3DES algorithm is used to encrypt the data after authentication, thereby ensuring security and improving efficiency.

Step 1054: transmitting the encrypted data request to the server.

After obtaining the encrypted data request, the encrypted data request may be transmitted to the server. Then, the server determines whether to execute a corresponding control instruction according to the data request and operable authority of the target user.

An authentication system according to an embodiment of the present disclosure is described hereinafter with reference to FIG. 2.

Figure 2:
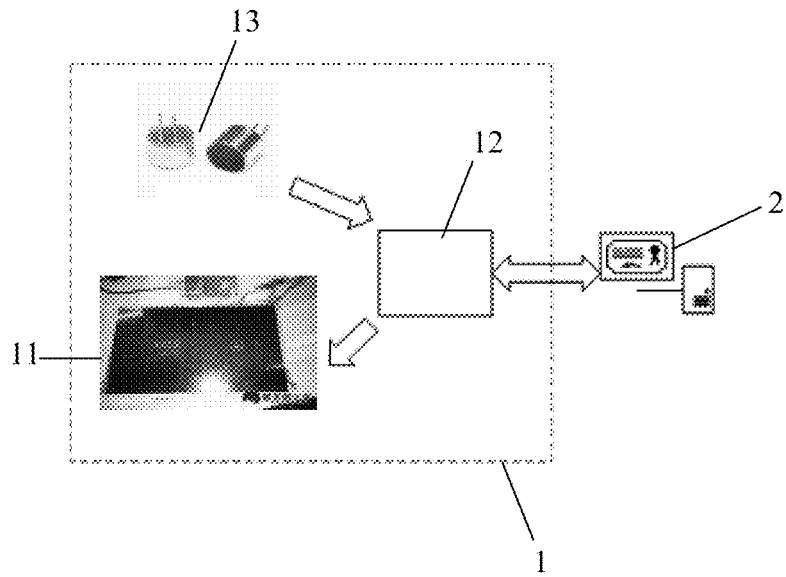
FIG. 2 is a schematic diagram of an authentication system according to an embodiment of the present disclosure.

Referring to FIG. 2, FIG. 2 is a schematic diagram of an authentication system according to an embodiment of the present disclosure. As shown in FIG. 2, the authentication system may include a smart mirror device 1 and a server 2. The smart mirror device 1 includes a display screen 11, a microphone 13, and a central processing unit (CPU) 12. The smart mirror device 1 may provide the following functions:

(1) for the device's music playback function, a song list collection mode is provided, which can synchronize song information selected by the user to a user account in the cloud server; each time the user logs in and uses the music function, a directory stored in the cloud server will be obtained through remote encryption function;

(2) the smart mirror device provides functions such as display settings, and can customize system user interface (UI) elements (including location, hidden) and UI colors; different users have their own choices which need to be stored on the cloud server for dynamic loading after login;

(3) since the electronic device is attractive to children, and the smart mirror devices have music-and-video related playback functions, it is easier to attract children to use them for a long time; in order to prevent children from using the playback function for a long time or operating the access control and other security facilities when the guardian is not around, by distinguishing adult and child voiceprints, child lock protection is provided to limit operation authority and time of child users;

(4) Text to voice (TTS) broadcast: according to the voiceprint information, different voice TTS tones for men, women and children are provided to meet personalized needs;

(5) an entrance mirror and a bathroom mirror can synchronize voiceprints of other users and save them locally through voiceprint of an administrator user, and set the permissions.

The microphone 13 is responsible for acquiring voice signals. The display screen 11 is responsible for displaying the UI interface. The CPU 12 is responsible for device management and control. The server 2 is responsible for storing cloud-based voice recognition feature parameters and user personal information data.

The authentication method according to one embodiment of the present disclosure combines voiceprint feature parameters and public and private keys for authentication, thereby avoiding mirror dirt during the authentication process and avoiding the risk of user privacy leakage.

In the authentication method according to one embodiment of the present disclosure, the target voice data input by the target user is received, and the first voiceprint feature parameter corresponding to the target voice data is then obtained from the device voiceprint model library. Then, the first encryption process is performed on the first voiceprint feature parameter with the locally stored private key to generate to-be-verified data, and then the to-be-verified data is transmitted to the server, so that the server uses the public key which matches the private key to decrypt the to-be-verified data to obtain the first voiceprint feature parameter, and performs authentication on the first voiceprint feature parameter to obtain an authentication result. Then, the authentication result returned by the server is received. Therefore, the authentication method according to one embodiment of the present disclosure combines voiceprint feature parameters and public and private keys for authentication, thereby avoiding the risk of user privacy leakage.

Figure 3A:
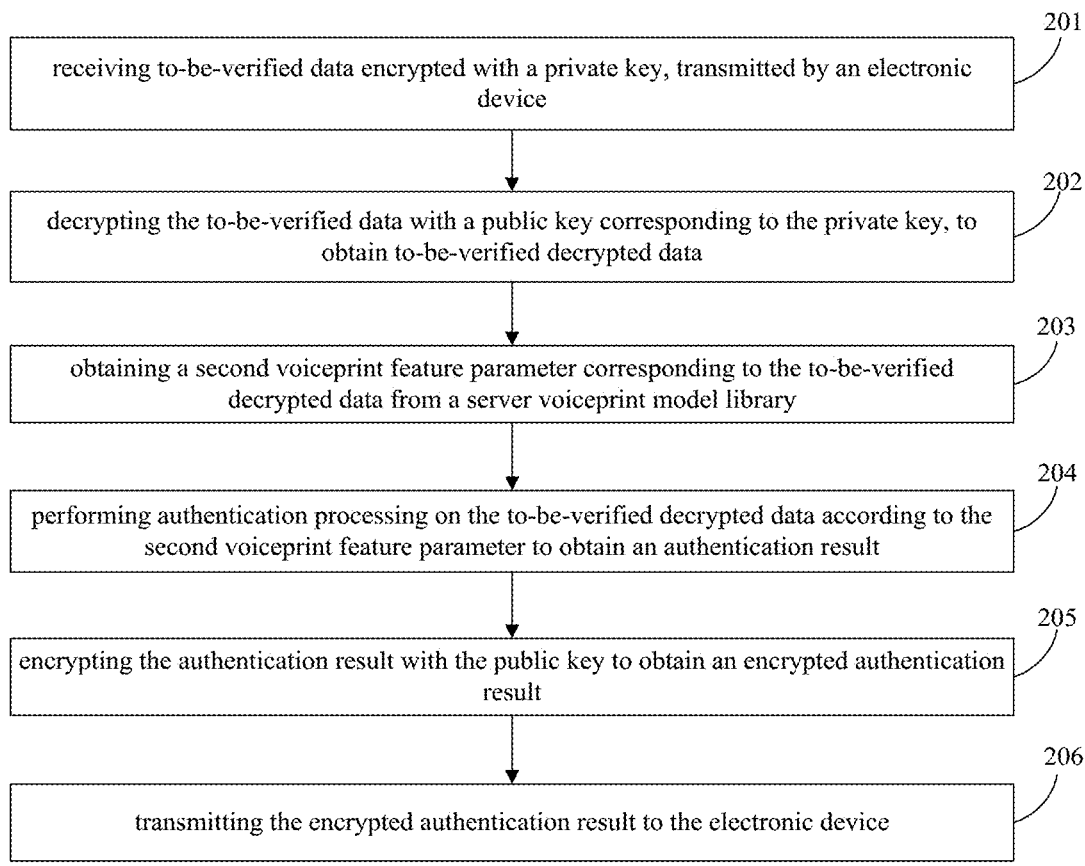
FIG. 3A is a flowchart of an authentication method according to an embodiment of the present disclosure.

Referring to FIG. 3A, FIG. 3A is a flowchart of an authentication method according to an embodiment of the present disclosure. The authentication method may be applied to a server and include the following steps.

Step 201: receiving to-be-verified data encrypted with a private key, transmitted by an electronic device.

In one embodiment of the present disclosure, RSA algorithm is used to encrypt and decrypt authentication data transmitted between the smart mirror device and the server. A private key is stored on the smart mirror device, and a public key is stored on the server. The public key and the private key are pre-generated by the server, and the server stores the public key, and the smart mirror device stores the private key.

One method for generating the public and private keys may refer to the description of the following specific implementation.

In a specific implementation of the present disclosure, before the foregoing step 201, the method may further include the following steps.

Step G1: obtaining a first prime number and a second prime number that are selected in advance and are greater than a set threshold.

In one embodiment of the present disclosure, the prime number refers to a natural number greater than 1, which cannot be divided by other natural numbers except 1 and itself.

The set threshold refers to a threshold set in advance by a business person. The specific value of the set threshold may be determined according to service requirements, which is not limited in the embodiment of the present disclosure.

When generating the public and private keys, the first prime number and the second prime number that are greater than the set threshold, may be selected in advance. That is, two prime numbers (i.e., the first prime number and the second prime number) that are sufficiently large, are selected. The first prime number and second prime number are not equal.

In the present disclosure, the first prime number may be recorded as "p", and the second prime number may be recorded as "q", which will be used in the following steps.

After obtaining the first prime number and the second prime number that are selected in advance, step G2 is performed.

Step G2: according to the first prime number and the second prime number, obtaining a first value via calculation.

After obtaining the first prime number p and the second prime number q, a first value n may be calculated, i.e., n=pq.

After the first value is obtained via calculation, step G3 is performed.

Step G3: obtaining an Euler value via calculation, according to the first value and Euler function.

After obtaining the first value n, the Euler value may be calculated through the Euler function: f(n)=(p−1)(q−1), where f (n) is the Euler value.

After obtaining the Euler value via calculation, step G4 is performed.

Step G4: obtaining a prime number that is coprime with the Euler value; where the prime number is greater than 1 and less than the Euler value.

After obtaining the Euler value via calculation, a prime number e that is coprime with the Euler value f(n) can be obtained, and the prime number e is greater than 1 and less than f(n).

After obtaining the prime number, step G5 is performed.

Step G5: according to the prime number and the Euler value, obtaining a second value via calculation according to a complementary function.

After obtaining the prime number e and the Euler value f(n), the second value d may be obtained via calculation according to de≡1 mod f(n), where ≡ is a symbol representing congruence in number theory. In other words, in the above formula, the left side of the symbol ≡ must be congruent to the right side of the symbol ≡, that is, the result of the modulo operation on both sides is the same, thereby calculating the second value d.

Step G6: obtaining the public key via calculation based on the prime number and the first value.

In this way, the public key KU can be obtained via calculation, i.e., KU=(e, n).

Step G7: obtaining the private key via calculation based on the first value and the second value.

After obtaining the first value n and the second value d, the private key KR can be obtained via calculation according to the first value n and the second value d, i.e., KR=(d, n).

Step G8: storing the public key locally, and transmitting the private key to the electronic device.

After obtaining the public key KU and the private key KR in the foregoing steps, the public key KU may be saved locally on the server, and the private key KR may be transmitted to the smart mirror device.

It will be appreciated that the foregoing process of obtaining the public and private keys is a relatively mature technology in the art, which will not be elaborated herein.

After the server receives the to-be-verified data encrypted with the private key transmitted by the electronic device, the server executes step 202.

Step 202: decrypting the to-be-verified data with a public key corresponding to the private key, to obtain to-be-verified decrypted data.

After receiving the to-be-verified data transmitted by the smart mirror device, the server can decrypt the to-be-verified data with the public key corresponding to the private key, thereby obtaining the to-be-verified decrypted data.

After obtaining the to-be-verified decrypted data, step 203 is performed.

Step 203: obtaining a second voiceprint feature parameter corresponding to the to-be-verified decrypted data from a server voiceprint model library.

The to-be-verified decrypted data includes a group identifier of a group in which a first voiceprint feature parameter is located in a device voiceprint model library, a device identifier of the smart mirror device and a first hash value corresponding to the first voiceprint feature parameter.

The process of generating the server voiceprint model library may refer to the description of the following specific implementation.

Figure 3B:
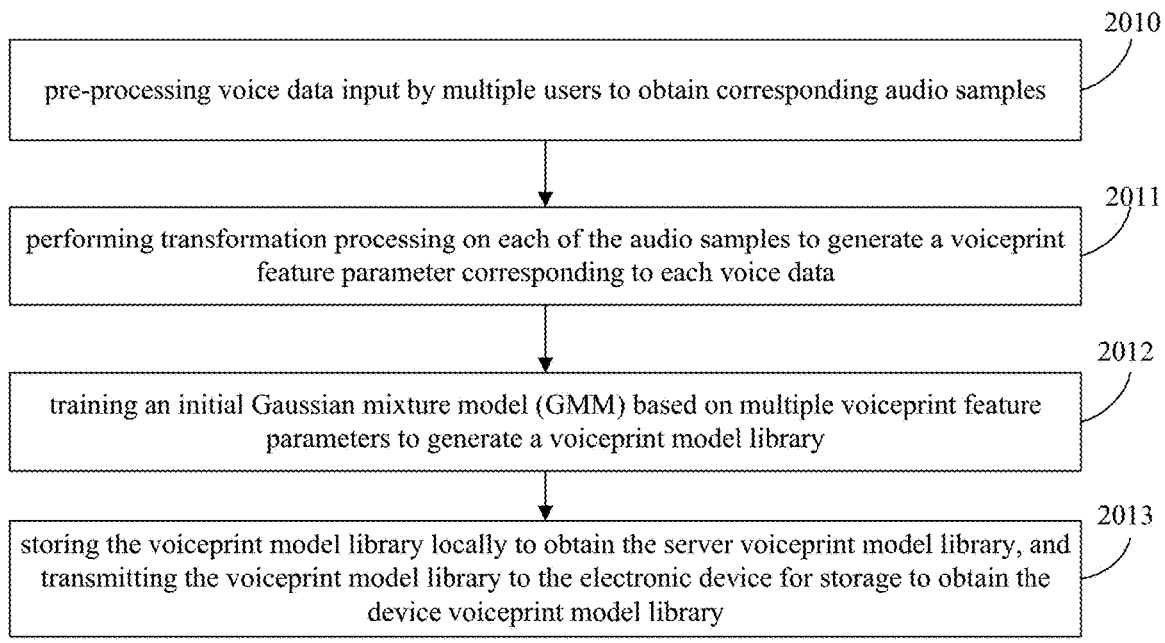
FIG. 3B is a flowchart of generating a voiceprint model library according to an embodiment of the present disclosure.

In a specific implementation of the present disclosure, as shown in FIG. 3B, before the foregoing step 201, the method may further include the following steps.

Step 2010: pre-processing voice data input by multiple users to obtain corresponding audio samples.

In one embodiment of the present disclosure, multiple users refer to multiple authorized users. For example, for the smart mirror device, a user 1, a user 2, . . . , a user n (n is a positive integer greater than or equal to 1) have been authorized, voice data of the user 1, the user 2, . . . , the user n may be used. It will be appreciated that the target user mentioned in the foregoing steps is one of the above multiple users.

For multiple authorized users, a preset voice acquisition device may be used to acquire the voice data input by each user separately.

After the voice data is acquired, the voice data may be pre-processed separately, such as type conversion, noise reduction, which will be described in detail in combination with the following specific implementation.

In another specific implementation of the present disclosure, the foregoing step 2010 may include the following sub-steps.

Sub-step B1: acquiring voice signals input by multiple users.

In one embodiment of the present disclosure, the voice signal input by each user may be acquired by a voice acquirer preset on the smart mirror device. Specifically, within a range that the voice acquirer can receive voice, the user can dictate a paragraph for the voice acquirer to acquire voice.

After acquiring voice signals input by the multiple users, sub-step B2 is performed.

Sub-step B2: performing type conversion processing on each of the voice signals to obtain multiple voice data.

The voice data refers to data generated after the voice signal is converted.

After acquiring the voice signal of each user, the acquired voice signals may be converted into electric signals, and the electric signals are processed by analog-to-digital conversion to generate voice data files.

After performing type conversion processing on each of the voice signals to obtain multiple voice data, sub-step B3 is performed.

Sub-step B3: performing pre-emphasis processing on each voice data to obtain multiple pre-emphasized voice data.

Because noise information may be mixed in the process of acquiring voice signals, the voice signals need to be pre-processed for noise reduction.

Pre-emphasis is a signal processing method that compensates high-frequency components of an input signal at a transmitting end. With the increase of the signal rate, the signal is greatly damaged during transmission. In order to obtain a better signal waveform at a receiving terminal, the damaged signal needs to be compensated. The idea of the pre-emphasis technique is to enhance high-frequency components of the signal at a beginning of transmission line, thereby compensating for excessive attenuation of high-frequency components during transmission.

The pre-emphasized voice data refers to voice data obtained after performing pre-emphasis processing on the voice data.

After obtaining multiple voice data, pre-emphasis processing may be performed on each voice data separately to obtain pre-emphasized voice data corresponding to each voice data, that is, to compensate for continuously attenuated high-frequency components of the voice data, so that the entire voice spectrum becomes smoother.

After performing pre-emphasis processing on each voice data to obtain multiple pre-emphasized voice data, sub-step B4 is performed.

Sub-step B4: dividing each pre-emphasized voice data into multiple voice segments according to a preset sampling rate by using frame blocking-windowing technique.

Frame blocking is to divide the voice signal of infinite length into segments, because the voice signal has short-term stability and is convenient for processing. Windowing is to make the frame-blocked voice signal more stable. Window functions mainly include rectangular windows and Hamming windows. The windowing is mainly to make time-domain signals better meet periodic requirements of FFT processing and reduce leakage.

The preset sampling rate refers to a sampling rate used in frame blocking. The size of the preset sampling rate may be determined according to service requirements, which is not limited in the embodiment of the present disclosure.

In one embodiment of the present disclosure, each pre-emphasized voice data is divided into multiple voice segments according to a preset sampling rate by using frame blocking-windowing technique. For example, voice data is divided according to a voice sampling rate of 16 KHz, and the obtained voice segment is set to 256 sampling points per frame, that is, a length of one frame is 16 ms, thereby meeting the short-term stability of the human voice signal.

After dividing each pre-emphasized voice data into multiple voice segments according to a preset sampling rate by using frame blocking-windowing technique, sub-step B5 is performed.

Sub-step B5: obtaining an effective voice segment from multiple voice segments, and using the effective voice segment as the audio sample.

The effective voice segment refers to a voice segment which is effective among the multiple voice segments.

After obtaining multiple voice segments corresponding to each pre-emphasized voice data, a threshold may be set to detect a start point and an end point of the pre-emphasized voice data, and the effective voice segment is intercepted, redundant information is removed, thereby achieving endpoint detection and improving the recognition accuracy of the system.

After pre-processing voice data input by multiple users to obtain corresponding audio samples, step 2011 is performed.

Step 2011: performing transformation processing on each of the audio samples to generate a voiceprint feature parameter corresponding to each voice data.

Voiceprint refers to sound wave spectrum which is displayed by an electroacoustic instrument and carries voice information.

After obtaining the audio sample corresponding to each user, transformation processing is performed on each audio sample to obtain a voiceprint feature parameter corresponding to each voice data. The specific transformation processing process is described in detail with the following specific implementation.

In a specific implementation of the present disclosure, the foregoing step 2011 may include the following sub-steps.

Sub-step C1: performing Fourier transform processing on each audio sample to obtain a linear frequency spectrum corresponding to each frame of audio signal included in the each audio sample.

In one embodiment of the present disclosure, Fourier transform (FFT) can express a function satisfying certain conditions as a trigonometric function (sine and/or cosine function) or a linear combination of their integrals.

After obtaining the audio samples, fast Fourier transform may be applied to the acquired audio samples. Specifically, a 256-point radix-2 fast Fourier transform method may be selected. After performing Fourier transform processing, a linear frequency spectrum corresponding to each frame of audio signal included in the each audio sample is obtained.

After obtaining a linear frequency spectrum corresponding to each frame of audio signal included in the each audio sample, sub-step C2 is performed.

Sub-step C2: performing modulo processing on the linear frequency spectrum corresponding to each frame of audio signal to obtain an energy spectrum corresponding to the linear frequency spectrum.

After obtaining the linear frequency spectrum of each frame of audio signal, modulo processing is performed on the linear frequency spectrum corresponding to each frame of audio signal to obtain the energy spectrum corresponding to the linear frequency spectrum. For example, each frame is represented by 256 FFT values (complex numbers), which are subjected to modulo processing to get 256 real numbers, that is, the energy spectrum. Then, each frame of voice sample is represented by 256 FFT modulus values.

After obtaining the energy spectrum corresponding to the linear frequency spectrum, sub-step C3 is performed.

Sub-step C3: performing scale transformation processing on the energy spectrum corresponding to the linear frequency spectrum to obtain a transformed energy spectrum corresponding to the linear frequency spectrum.

In order to simulate the human ear's perception of sound as much as possible, the energy spectrum is generally scaled and mapped to the Mel frequency scale. In other words, a non-linear scale transformation is performed on the horizontal axis of the natural spectrum of the voice after FFT to obtain a new energy spectrum at the Mel frequency scale (i.e., the transformed energy spectrum).

After obtaining the transformed energy spectrum, sub-step C4 is performed.

Sub-step C4: performing cepstral analysis on the transformed energy spectrum to determine the voiceprint feature parameter corresponding to the voice data.

After obtaining the transformed energy spectrum, the cepstral analysis (such as Mel cepstral analysis) may be performed on the transformed energy spectrum to obtain the voiceprint feature parameter.

After performing transformation processing on each of the audio samples to generate a voiceprint feature parameter corresponding to each voice data, step 2012 is performed.

Step 2012: training an initial Gaussian mixture model (GMM) based on multiple voiceprint feature parameters to generate a voiceprint model library.

Based on the voiceprint feature parameters obtained in the foregoing step 2011, Gaussian mixture models (GMMs) for training voice signals according to the voiceprint feature parameters form the voiceprint model library. The Gaussian mixture model can describe distribution of feature vectors in probability space with multiple Gaussian probability density functions.

Step 2013: storing the voiceprint model library locally to obtain the server voiceprint model library, and transmitting the voiceprint model library to the electronic device for storage to obtain the device voiceprint model library.

The voiceprint model library is stored in the cloud server and a local data storage module. Further, the voiceprint model library stored in the electronic device is the device voiceprint model library. In the electronic device, the voiceprint model library may be encrypted with a password reserved by the user, thereby realizing encrypted storage and preventing tampering. The voiceprint model library stored in the server is the server voiceprint model library.

Then, the corresponding second voiceprint feature parameter can be obtained from the server voiceprint model library according to the to-be-verified decrypted data, which will be described in detail with the following specific implementation.

In a specific implementation of the present disclosure, the foregoing step 203 may include the following sub-steps.

Sub-step H1: searching for a second voiceprint feature parameter corresponding to the group identifier from the server voiceprint model library according to the device identifier.

In one embodiment of the present disclosure, after obtaining the device identifier of the smart mirror device, multiple groups corresponding to the device identifier may be searched according to the device identifier. Then, the second voiceprint feature parameter corresponding to the group identifier can be searched and obtained according to the group identifier corresponding to the first voiceprint feature parameter.

After obtaining a second voiceprint feature parameter corresponding to the to-be-verified decrypted data from a server voiceprint model library, step 204 is performed.

Step 204: performing authentication processing on the to-be-verified decrypted data according to the second voiceprint feature parameter to obtain an authentication result.

After obtaining the second voiceprint feature parameter corresponding to the to-be-verified decrypted data, the authentication processing is performed on the to-be-verified decrypted data according to the second voiceprint feature parameter to obtain the authentication result, which will be described in detail with the following specific implementation.

Figure 3C:
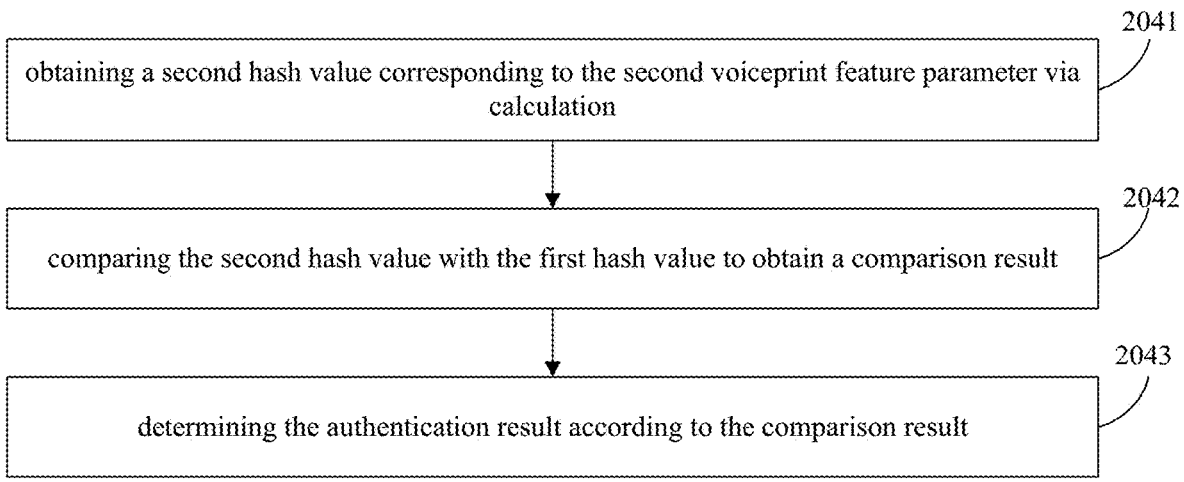
FIG. 3C is a flowchart of determining an authentication result according to an embodiment of the present disclosure.

In a specific implementation of the present disclosure, as shown in FIG. 3C, the foregoing step 204 may include the following sub-steps.

Sub-step 2041: obtaining a second hash value corresponding to the second voiceprint feature parameter via calculation.

In one embodiment of the present disclosure, the second hash value refers to a hash value obtained by performing calculation on the second voiceprint feature parameter.

After obtaining the second voiceprint feature parameter, the second hash value corresponding to the second voiceprint feature parameter may be obtained by performing calculation on the second voiceprint feature parameter, and then sub-step 2042 is performed.

Sub-step 2042: comparing the second hash value with the first hash value to obtain a comparison result.

After obtaining the second hash value, the second hash value may be compared with the first hash value to obtain the comparison result. In one embodiment of the present disclosure, the comparison result may include same or different.

Sub-step 2043: determining the authentication result according to the comparison result.

After obtaining the comparison result of the second hash value and the first hash value, the authentication result may be determined according to the comparison result. That is, when the second hash value and the first hash value are the same, the authentication result is a result of successful authentication.

When the second hash value is different from the first hash value, the authentication result is the result of unsuccessful authentication.

Step 205: encrypting the authentication result with the public key to obtain an encrypted authentication result.

After obtaining the authentication result, the authentication result may be encrypted with the public key to obtain the encrypted authentication result.

When the authentication result is the result of successful authentication, a 112-bit preset key may be randomly generated by the server, and the combination of the public key and the preset key is used together to encrypt the authentication result, so that in the subsequent process, the preset key may be directly used for encryption and decryption, thereby ensuring data security during data transmission.

Step 206: transmitting the encrypted authentication result to the electronic device.

After obtaining the encrypted authentication result, the encrypted authentication result may be transmitted to the smart mirror device.

Then, the smart mirror device decrypts the encrypted authentication result with the private key to obtain the authentication result. Then, according to the authentication result obtained by decrypting the encrypted authentication result, the smart mirror device determines whether to allow the user to control the IoT device associated with the smart mirror device.

In the authentication method according to one embodiment of the present disclosure, the server receives the to-be-verified data encrypted with the private key and transmitted by the electronic device, decrypts the to-be-verified data with the public key corresponding to the private key to obtain to-be-verified decrypted data. Then, the server obtains the second voiceprint feature parameter corresponding to the to-be-verified decrypted data from the server voiceprint model library, and performs authentication processing on the to-be-verified decrypted data according to the second voiceprint feature parameter to obtain the authentication result. And then, the server encrypts the authentication result with the public key to obtain an encrypted authentication result and transmits the encrypted authentication result to the electronic device. Therefore, the authentication method according to one embodiment of the present disclosure combines voiceprint feature parameters and public and private keys for authentication, thereby avoiding the risk of user privacy leakage.

Figure 4:
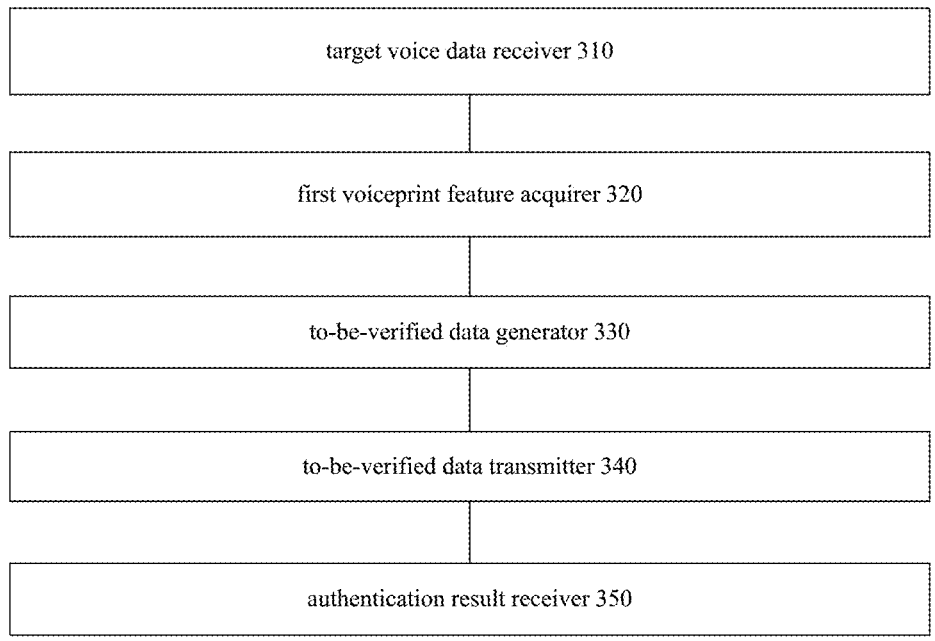
FIG. 4 is a schematic diagram of an authentication device according to an embodiment of the present disclosure.

Referring to FIG. 4, FIG. 4 is a schematic diagram of an authentication device according to an embodiment of the present disclosure. The authentication device may be applied to an electronic device and includes:

a target voice data receiver 310 configured to receive target voice data input by a target user;

a first voiceprint feature acquirer 320 configured to obtain a first voiceprint feature parameter corresponding to the target voice data from a device voiceprint model library;

a to-be-verified data generator 330 configured to perform a first encryption process on the first voiceprint feature parameter with a locally stored private key to generate to-be-verified data;

a to-be-verified data transmitter 340 configured to transmit the to-be-verified data to a server, so that the server uses a public key which matches the private key to decrypt the to-be-verified data to obtain the first voiceprint feature parameter, and performs authentication on the first voiceprint feature parameter to obtain an authentication result;

an authentication result receiver 350 configured to receive the authentication result returned by the server.

Optionally, the first voiceprint feature acquirer 320 includes:

a target voiceprint feature extractor configured to extract a target voiceprint feature parameter in the target voice data;

a matched voiceprint feature acquirer configured to match the target voiceprint feature parameter with a plurality of voiceprint feature parameters pre-stored in the device voiceprint model library, thereby obtaining at least one matched voiceprint feature parameter;

a matching probability value acquirer configured to obtain a matching probability value between the target voiceprint feature parameter and each matched voiceprint feature parameter;

a first voiceprint feature determinator configured to determine the first voiceprint feature parameter from the at least one matched voiceprint feature parameter, according to a similarity criterion and each matching probability value.

Optionally, the to-be-verified data generator 330 includes:

a first hash value calculator configured to obtain a first hash value corresponding to the first voiceprint feature parameter via calculation;

a device identifier acquirer configured to obtain a device identifier of the electronic device;

a group identifier acquirer configured to obtain a group identifier of a group in which the first voiceprint feature parameter is located in the device voiceprint model library;

a to-be-verified data generator configured to encrypt the first hash value, the device identifier and the group identifier with the private key to generate the to-be-verified data.

Optionally, the authentication result receiver 350 includes:

an encryption authentication result receiver configured to receive from the server, an encrypted authentication result of using the public key to encrypt the authentication result and the preset key.

The authentication device further includes:

a preset key acquirer configured to decrypt the encrypted authentication result with the private key to obtain the preset key and the authentication result;

a data request acquirer configured to, when the authentication result is successful authentication, obtain a data request transmitted by the target user;

an encrypted request acquirer configured to encrypt the data request with the preset key to obtain an encrypted data request; and an encrypted request transmitter configured to transmit the encrypted data request to the server.

In the authentication device according to one embodiment of the present disclosure, the target voice data input by the target user is received, and the first voiceprint feature parameter corresponding to the target voice data is then obtained from the device voiceprint model library. Then, the first encryption process is performed on the first voiceprint feature parameter with the locally stored private key to generate to-be-verified data, and then the to-be-verified data is transmitted to the server, so that the server uses the public key which matches the private key to decrypt the to-be-verified data to obtain the first voiceprint feature parameter, and performs authentication on the first voiceprint feature parameter to obtain an authentication result. Then, the authentication result returned by the server is received. Therefore, the authentication device according to one embodiment of the present disclosure combines voiceprint feature parameters and public and private keys for authentication, thereby avoiding the risk of user privacy leakage.

Figure 5:
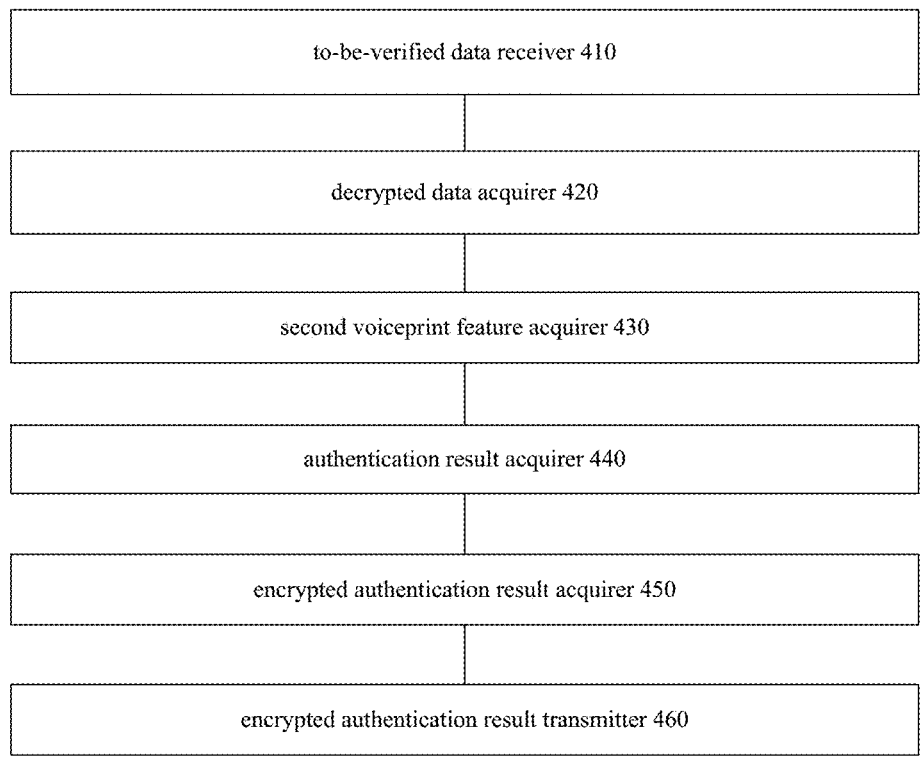
FIG. 5 is a schematic diagram of an authentication device according to an embodiment of the present disclosure.

Referring to FIG. 5, FIG. 5 is a schematic diagram of an authentication device according to an embodiment of the present disclosure. The authentication device may be applied to a server and include:

a to-be-verified data receiver 410 configured to receive to-be-verified data encrypted with a private key, transmitted by an electronic device;

a decrypted data acquirer 420 configured to decrypt the to-be-verified data with a public key corresponding to the private key, to obtain to-be-verified decrypted data;

a second voiceprint feature acquirer 430 configured to obtain a second voiceprint feature parameter corresponding to the to-be-verified decrypted data from a server voiceprint model library;

an authentication result acquirer 440 configured to perform authentication processing on the to-be-verified decrypted data according to the second voiceprint feature parameter to obtain an authentication result;

an encrypted authentication result acquirer 450 configured to encrypt the authentication result with the public key to obtain an encrypted authentication result; and an encrypted authentication result transmitter 460 configured to transmit the encrypted authentication result to the electronic device.

Optionally, the authentication device further includes:

an audio sample acquirer configured to pre-process voice data input by multiple users to obtain corresponding audio samples;

a voiceprint feature generator configured to perform transformation processing on each of the audio samples to generate a voiceprint feature parameter corresponding to each voice data;

a voiceprint model library generator configured to train an initial Gaussian mixture model (GMM) based on multiple voiceprint feature parameters to generate a voiceprint model library;

a device-server model acquirer configured to store the voiceprint model library locally to obtain the server voiceprint model library, and transmit the voiceprint model library to the electronic device for storage to obtain the device voiceprint model library.

Optionally, the audio sample acquirer includes:

a voice signal collector configured to acquire voice signals input by multiple users;

a voice data acquirer configured to perform type conversion processing on each of the voice signals to obtain multiple voice data;

a pre-emphasis data acquirer configured to perform pre-emphasis processing on each voice data to obtain multiple pre-emphasized voice data;

a voice segment divider configured to divide each pre-emphasized voice data into multiple voice segments according to a preset sampling rate by using frame blocking-windowing technique;

an audio sample acquirer configured to obtain an effective voice segment from multiple voice segments, and use the effective voice segment as the audio sample.

Optionally, the voiceprint feature generator includes:

a linear frequency spectrum acquirer configured to perform Fourier transform processing on each audio sample to obtain a linear frequency spectrum corresponding to each frame of audio signal included in the each audio sample;

an energy spectrum acquirer configured to perform modulo processing on the linear frequency spectrum corresponding to each frame of audio signal to obtain an energy spectrum corresponding to the linear frequency spectrum;

a transformed energy spectrum acquirer configured to perform scale transformation processing on the energy spectrum corresponding to the linear frequency spectrum to obtain a transformed energy spectrum corresponding to the linear frequency spectrum;

a voiceprint feature parameter determinator configured to perform cepstral analysis on the transformed energy spectrum to determine the voiceprint feature parameter corresponding to the voice data.

Optionally, the authentication device further includes:

a prime number acquirer configured to obtain a first prime number and a second prime number that are selected in advance and are greater than a set threshold;

a first numerical calculator configured to obtain a first value via calculation according to the first prime number and the second prime number;

an Euler numerical calculator configured to obtain an Euler value via calculation according to the first value and Euler function;

a prime number acquirer configured to obtain a prime number that is coprime with the Euler value; where the prime number is greater than 1 and less than the Euler value;

a second numerical calculator configured to obtain a second value via calculation based on the prime number and the Euler value according to a complementary function;

a public key calculator configured to obtain the public key via calculation based on the prime number and the first value;

a private key calculator configured to obtain the private key via calculation based on the first value and the second value;

a private key transmitter configured to store the public key locally, and transmit the private key to the electronic device.

Optionally, the to-be-verified decrypted data includes a group identifier of a group in which a first voiceprint feature parameter is located in a device voiceprint model library, a device identifier of the electronic device and a first hash value corresponding to the first voiceprint feature parameter.

The second voiceprint feature acquirer 430 includes: a second voiceprint feature finder configured to search for a second voiceprint feature parameter corresponding to the group identifier from the server voiceprint model library according to the device identifier.

The authentication result acquirer 440 includes:

a second hash value calculator configured to obtain a second hash value corresponding to the second voiceprint feature parameter via calculation;

a comparison result acquirer configured to compare the second hash value with the first hash value to obtain a comparison result;

an authentication result determinator configured to determine the authentication result according to the comparison result.

Optionally, the authentication result determinator includes:

a successful authentication result acquirer configured to, when the comparison result is that the second hash value and the first hash value are the same, obtain a result of successful authentication;

an unsuccessful authentication result acquirer configured to, when the comparison result is that the second hash value is different from the first hash value, obtain a result of unsuccessful authentication.

In the authentication device according to one embodiment of the present disclosure, the authentication device receives the to-be-verified data encrypted with the private key and transmitted by the electronic device, decrypts the to-be-verified data with the public key corresponding to the private key to obtain to-be-verified decrypted data. Then, the authentication device obtains the second voiceprint feature parameter corresponding to the to-be-verified decrypted data from the server voiceprint model library, and performs authentication processing on the to-be-verified decrypted data according to the second voiceprint feature parameter to obtain the authentication result. And then, the authentication device encrypts the authentication result with the public key to obtain an encrypted authentication result and transmits the encrypted authentication result to the electronic device. Therefore, the authentication device according to one embodiment of the present disclosure combines voiceprint feature parameters and public and private keys for authentication, thereby avoiding the risk of user privacy leakage.

One embodiment of the present disclosure further provides an electronic device, including: a processor, a memory, and a computer program stored on the memory and executable on the processor. The processor executes the program to implement the authentication method of any one of the above embodiments.

One embodiment of the present disclosure further provides a computer-readable storage medium, including computer instructions stored thereon. When the computer instructions are executed by a processor of the electronic device, the electronic device is capable of implementing the authentication method of any one of the above embodiments.

The embodiments of the device and the method thereof have been described hereinbefore using block diagrams, flow charts and/or examples. It should be appreciated that, in the case that the block diagrams, flow charts and/or examples include one or more functions and/or operations, each function and/or operation included in the block diagrams, flow charts and/or examples may be implemented individually, or collectively, through hardware, software, firmware or essentially the combinations thereof. In one embodiment, several parts of the subject matter of the present disclosure may be implemented by an application specific integrated circuit (ASIC), a field programmable gate array (FPGA), a digital signal processor (DSP) or any other integration formats.

Any module or unit in the embodiments of the present disclosure may be implemented mechanically or electronically. For example, one module may include a permanent circuit or a logic element for a specific operation. The module may also include a programmable logic element or circuit (e.g., a general-purpose processor or any other programmable processors) configured temporarily by the software, so as to perform the specific operation. However, it should also be appreciated that, some aspects of the embodiments of the present disclosure may be, completely or partially, implemented equivalently in an integrated circuit as one or more programs capable of being run on one or more computers (e.g., computer systems), one or more programs capable of being run on one or more processors (e.g., microprocessors), firmware, or essentially combinations thereof. According to the present disclosure, a person skilled in the art has the capability of designing the circuits and/or writing software and/or firmware codes. In addition, it should further be appreciated that, mechanisms of the subject matter of the present disclosure may be dispersed as program products in various forms, and regardless of the types of a signal-carrying medium actually used for the dispersion, the signal-carrying medium may be applicable to the illustrative embodiments of the subject matter of the present disclosure. Examples of the signal-carrying medium include, but not limited to, a recording-type medium such as a soft disc, a hard disc drive, a compact disc (CD), a digital versatile disc (DVD), a digital tape and a computer memory; and a transmission-type medium such as a digital and/or analogue communication medium (e.g., an optical fiber/cable, a waveguide tube, a wired communication link and a wireless communication link).

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

The various embodiments in the present specification are described in a progressive manner, and each embodiment focuses on differences from other embodiments, and the same similar parts between the various embodiments can be referred to each other.

It should also be noted that in this application, relational terms such as first and second are merely used to differentiate different components rather than to represent any order, number or importance. Further, the term "including", "include" or any variants thereof is intended to cover a non-exclusive contain, so that a process, a method, an article or a user equipment, which includes a series of elements, includes not only those elements, but also includes other elements which are not explicitly listed, or elements inherent in such a process, method, article or user equipment. In absence of any further restrictions, an element defined by the phrase "including one . . . " does not exclude the existence of additional identical elements in a process, method, article, or user equipment that includes the element.

The above are merely the preferred embodiments of the present disclosure. It should be noted that, a person skilled in the art may make improvements and modifications without departing from the principle of the present disclosure, and these improvements and modifications shall also fall within the scope of the present disclosure.

What is claimed is:

1. An authentication method applied to an electronic device, comprising:
receiving target voice data;
obtaining a first voiceprint feature parameter corresponding to the target voice data from a device voiceprint model library, wherein the device voiceprint model library is configured to store voiceprint feature parameters of authorized users in a local system of the electronic device, and the first voiceprint feature parameter is obtained by matching the voiceprint feature parameters corresponding to the target voice data with the voiceprint feature parameters of the authorized users in the device voiceprint model library;
performing a first encryption process on the first voiceprint feature parameter with a locally stored private key to generate to-be-verified data;
transmitting the to-be-verified data to a server, so that the server uses a public key which matches the private key to decrypt the to-be-verified data to obtain the first voiceprint feature parameter, and performs authentication on the first voiceprint feature parameter to obtain an authentication result;
receiving the authentication result returned by the server, generating a corresponding data request according to a control instruction input by a user when the authentication result is successful authentication, and transmitting an encrypted data request to the server to enable the server to determine whether to execute a corresponding control instruction according to the data request and operable authority of a target user;
wherein the performing a first encryption process on the first voiceprint feature parameter with a locally stored private key to generate to-be-verified data, comprises:
obtaining a first hash value corresponding to the first voiceprint feature parameter via calculation;
obtaining a device identifier of the electronic device;
obtaining a group identifier of a group in which the first voiceprint feature parameter is located in the device voiceprint model library;
encrypting the first hash value, the device identifier and the group identifier with the private key to generate the to-be-verified data; and
wherein the obtaining a first voiceprint feature parameter corresponding to the target voice data from a device voiceprint model library, includes:
extracting the target voiceprint feature parameter in the target voice data;
matching the target voiceprint feature parameter with a plurality of voiceprint feature parameters pre-stored in the device voiceprint model library, thereby obtaining at least one matched voiceprint feature parameter;
obtaining a matching probability value between the target voiceprint feature parameter and each of the at least one matched voiceprint feature parameter;
determining the first voiceprint feature parameter from the at least one matched voiceprint feature parameter, according to a similarity criterion and the matching probability value.

2. The method according to claim 1, wherein the receiving the authentication result returned by the server, includes: receiving from the server, an encrypted authentication result of using the public key to encrypt the authentication result and a preset key;
after the receiving the authentication result returned by the server, the method further includes:
decrypting the encrypted authentication result with the private key to obtain the preset key and the authentication result;
when the authentication result is successful authentication, obtaining a data request;
encrypting the data request with the preset key to obtain an encrypted data request;
transmitting the encrypted data request to the server.

3. The method according to claim 1, wherein the receiving target voice data, includes:
using a voice acquirer of a device to acquire voice signals.

4. An electronic device, comprising: a processor, a memory, and a computer program stored on the memory and executable on the processor; wherein the processor executes the computer program to implement the authentication method according to claim 1.

5. A computer non-transitory readable storage medium comprising computer instructions stored thereon; wherein the computer instructions are executed by a processor of an electronic device to cause the electronic device to implement the authentication method according to claim 1.

6. An authentication device applied to an electronic device, comprising:
a target voice data receiver configured to receive target voice data;
a first voiceprint feature acquirer configured to obtain a first voiceprint feature parameter corresponding to the target voice data from a device voiceprint model library;
wherein the device voiceprint model library is configured to store voiceprint feature parameters of authorized users in a local system of the electronic device, and the first voiceprint feature parameter is obtained by matching the voiceprint feature parameters corresponding to the target voice data with the voiceprint feature parameters of the authorized users in the device voiceprint model library;
a to-be-verified data generator configured to perform a first encryption process on the first voiceprint feature parameter with a locally stored private key to generate to-be-verified data;
a to-be-verified data transmitter configured to transmit the to-be-verified data to a server, so that the server uses a public key which matches the private key to decrypt the to-be-verified data to obtain the first voiceprint feature parameter, and performs authentication on the first voiceprint feature parameter to obtain an authentication result;
an authentication result receiver configured to receive the authentication result returned by the server, a corresponding data request is generated according to a control instruction input by a user when the authentication result is successful authentication, and an encrypted data request is transmitted to the server to enable the server to determine whether to execute a corresponding control instruction according to the data request and operable authority of a target user;
wherein the to-be-verified data generator is further configured to:
obtain a first hash value corresponding to the first voiceprint feature parameter via calculation;
obtain a device identifier of the electronic device;
obtain a group identifier of a group in which the first voiceprint feature parameter is located in the device voiceprint model library;
encrypt the first hash value, the device identifier and the group identifier with the private key to generate the to-be-verified data; and
wherein the first voiceprint feature acquirer is further configured to:
extract the target voiceprint feature parameter in the target voice data;
match the target voiceprint feature parameter with a plurality of voiceprint feature parameters pre-stored in the device voiceprint model library, thereby obtaining at least one matched voiceprint feature parameter;
obtain a matching probability value between the target voiceprint feature parameter and each of the at least one matched voiceprint feature parameter; and
determine the first voiceprint feature parameter from the at least one matched voiceprint feature parameter, according to a similarity criterion and the matching probability value.

7. The device according to claim 6, wherein the target voice data receiver is a voice acquirer of a device.

* * * * *